United States Patent [19]
Gibb et al.

[11] Patent Number: 6,159,629
[45] Date of Patent: Dec. 12, 2000

[54] VOLUME EFFECIENT LAYERED MANIFOLD ASSEMBLY FOR ELECTROCHEMICAL FUEL CELL STACKS

[75] Inventors: Peter R. Gibb, Coquitlam; David Kau-Kee Yip, Vancouver, both of Canada

[73] Assignee: Ballard Power Systems Inc., Burnaby, Canada

[21] Appl. No.: 09/215,585

[22] Filed: Dec. 17, 1998

[51] Int. Cl.[7] ............................... H01M 2/00; H01M 2/14
[52] U.S. Cl. ................... 429/39; 429/34; 429/38
[58] Field of Search .................. 429/34, 38, 39

[56] References Cited

U.S. PATENT DOCUMENTS

| | | | |
|---|---|---|---|
| 4,728,585 | 3/1988 | Briggs | 429/36 |
| 5,484,666 | 1/1996 | Gibb et al. | 429/34 |
| 5,486,430 | 1/1996 | Gorbell et al. | 429/35 |
| 5,527,634 | 6/1996 | Meacham | 429/35 |
| 5,776,624 | 7/1998 | Neutzler | 429/26 |
| 5,789,091 | 8/1998 | Wozniczka et al. | 429/12 |
| 5,811,202 | 9/1998 | Petraglia | 429/35 |
| 6,066,409 | 5/2000 | Ronne et al. | 429/39 |

FOREIGN PATENT DOCUMENTS

| | | |
|---|---|---|
| 4-294066 | 10/1992 | Japan . |
| 5-047408 | 2/1993 | Japan . |
| 5-182684 | 7/1993 | Japan . |
| 7-282836 | 10/1995 | Japan . |
| 8-055631 | 2/1996 | Japan . |
| 8-088018 | 4/1996 | Japan . |
| 8-203553 | 8/1996 | Japan . |
| 8-213044 | 8/1996 | Japan . |
| 8-293318 | 11/1996 | Japan . |
| 9-022717 | 1/1997 | Japan . |
| 10-074527 | 3/1998 | Japan . |
| WO 95/28010 | 10/1995 | WIPO . |

*Primary Examiner*—Maria Nuzzolillo
*Assistant Examiner*—Tracy Dove
*Attorney, Agent, or Firm*—McAndrews, Held & Malloy, Ltd.

[57] ABSTRACT

A volume efficient, layered manifold assembly is disclosed for an array of one or more internally manifolded fuel cell stacks. The assembly comprises a stack of substantially planar layers in which each pair of adjacent layers defines a fluid distribution chamber or plenum. Appropriate passages connect each chamber to the internal manifolds of the fuel cell stacks and to various external fluid ports for supply or exhaust of fuel, oxidant, or coolant streams. Passages for at least one fluid penetrate the layers defining the distribution chamber for another fluid. Valving can be incorporated directly in the manifold assembly and used to periodically reverse the direction of fluid flow through internal manifolds of the fuel cell stacks.

23 Claims, 17 Drawing Sheets

VOLUME EFFECIENT LAYERED MANIFOLD ASSEMBLY FOR ELECTROCHEMICAL FUEL CELL STACKS

FIELD OF THE INVENTION

The present invention relates to fluid manifolds for electrochemical fuel cell stacks and arrays.

BACKGROUND OF THE INVENTION

Electrochemical fuel cells convert reactants, namely, fuel and oxidant fluid streams, to generate electric power and reaction products. Electrochemical fuel cells generally employ an electrolyte disposed between two electrodes, namely a cathode and an anode. An electrocatalyst is employed to induce the desired electrochemical reactions at the electrodes. In addition to electrocatalyst, the electrodes may also comprise an electrically conductive porous substrate upon which the electrocatalyst is deposited. A particularly preferred fuel cell is the solid polymer electrolyte fuel cell, which employs a membrane electrode assembly ("MEA"). The MEA comprises a solid polymer electrolyte or ion-exchange membrane disposed between two porous electrode layers.

A broad range of reactants can be used in electrochemical fuel cells. For example, the fuel stream may be substantially pure hydrogen gas, a gaseous hydrogen-containing reformate stream, or methanol in a direct methanol fuel cell. The oxidant may be substantially pure oxygen or a dilute oxygen stream such as air. Both the fuel and oxidant streams are typically delivered to their appropriate electrodes via flow field plates. A flow field plate is located next to each electrode substrate on the side opposite the electrolyte/electrocatalyst interface. Fluid passages may be formed in the flow field plates (e.g., a pattern of fluid channels) such that fluid is essentially delivered over the entire porous electrode substrate. Flow field plates also typically serve as current collectors and as structural supports for the electrodes.

The output voltage of a single fuel cell under load is typically less than one volt. Therefore, in order to provide greater output voltage, usually numerous cells are stacked together and are connected in series to create a higher voltage fuel cell stack. End plates are placed at each end of the stack to hold the stack together and to compress the stack components together. Compressive force is needed for effecting seals and making electrical contact between various stack components. For various reasons, some resilience is needed in the compression end plate assemblies, for instance to accommodate and compensate for dimensional changes and to maintain compressive force over prolonged periods of time. Examples of various resilient compression end plate assemblies are disclosed in U.S. Pat. Nos. 5,484,666, 5,789,091, and PCT/International Publication No. WO95/28010 (Application No. PCT/CA95/00182).

Since the electrochemical reactions in a fuel cell are exothermic, often a cooling fluid is circulated at various locations throughout a fuel cell stack. (A liquid coolant, e.g. water, is commonly used, especially in high power fuel cell stacks.) Typically other additional flow field plates are employed to circulate the cooling fluid in thermal contact with components in a fuel cell stack. Thus, fuel cell stacks frequently comprise multiple flow field plates for three different fluids (i.e., fuel, oxidant, and coolant) and desirably comprise fluid manifolds to distribute these fluids to each flow field plate.

Preferably, each stack fluid is derived from a common supply and, where appropriate, each is ultimately discharged to a common exhaust. (Although substantially pure reactant streams can be dead-ended in a stack, even these are commonly exhausted periodically in order to purge accumulations of impurities.) One approach to connecting each flow field plate to a common fluid supply and exhaust is to internally manifold the fuel cell stack. That is, an external fluid is supplied to and exhausted from each respective flow field in the stack via common supply and exhaust ports. The ports in turn are connected to a pair of manifolds formed within the stack itself.

The two manifolds in turn are connected to opposite ends of each flow field in the stack. Preferably, the internal manifolds are designed such that the reactant pressure and flow are similar through each flow field in the stack.

In certain fuel cell systems, multiple fuel cell stacks are connected in a series and/or parallel array. Preferably the fuel cell stack manifolds are interconnected to form common array manifolds so that each of the fuel, oxidant, and coolant streams can ultimately be provided and discharged by a single connection to the entire array. Preferably, the "stack" manifolds are designed such that the fluid pressure and flow are similar through each stack in the array.

A conventional manifold arrangement for an array of fuel cell stacks employs a network of pipes, with larger pipes providing a common fluid supply (or exhaust) that connect in turn to smaller branch pipes, each at relatively similar pressures, leading to each individual stack. To obtain the most efficient flow of fluid, conventional piping with a circular cross section is preferred. Also, to withstand pressure using a minimum wall thickness, conventional round piping is preferred.

However, the volume occupied by such array manifolds can be substantial, often being much greater than the actual volume of the piping itself. It can be difficult to accommodate complex conventional piping networks in the space available in certain fuel cell applications.

For parts reduction and volume efficiency, stack manifolds can be incorporated into the compression end plates of the fuel cell stacks in the array. For example, U.S. Patent No. 5,486,430 shows an array manifold integrated into the compression end plates of multiple fuel cell stacks. Therein, the fuel cell system fluids flow through main array passages formed in the end plates which, in turn, are connected by branch passages to the inlets and outlets of internal manifolds of the fuel cell stacks. If the cross-sectional area of the main array passages is significantly larger than that of stack branch passages, a minimal pressure loss occurs along the length of the main array passages and thus the fluid flow to each stack branch is similar. However, the minimum thickness of an end plate comprising a circular main passage is of course limited to the diameter of the circular passage. Further, the minimum width of the thinnest end plate comprising a row of circular main passages is limited to the sum of the diameters of the circular passages in the row. To improve the viability of fuel cells as a commercial power source, it is generally desirable to improve the power density of the stack, that is, to reduce the stack dimensions and weight for a given electrical power output capability. Thus, where possible, it may be desirable to employ thinner and/or narrower manifold and end plate assemblies.

Although it adds complexity to a fuel cell system, it can be advantageous to periodically reverse the flow of fluids through the flow fields in a fuel cell stack (e.g., for purposes of distributing water to a solid polymer ion-exchange membrane in a fuel cell, as disclosed in U.S. Patent Application Serial No. 08/980,496, filed Dec. 1, 1997 by the same applicant as that for the present application). If possible then, it may also be desirable to incorporate flow reversing or flow switching mechanisms or devices into improved manifold assemblies.

SUMMARY OF THE INVENTION

A layered manifold assembly for use in a fuel cell array comprising one or more internally manifolded fuel cell stack comprises substantially planar layers that define chambers or plenums therebetween, fluid passages penetrating the layers and fluidly connecting the chambers to fluid ports, and manifold passages also penetrating the layers and fluidly connecting the chambers to internal manifold ports. Such a manifold provides a compact, thin assembly for distributing a fuel cell fluid (e.g. a supply or exhaust of a fuel cell reactant or coolant) to appropriate internal manifolds of fuel cell stacks in the array. The distribution is accomplished via fluid passages, which penetrate the fluid passage of another fuel cell fluid. Additionally, a substantially planar layered manifold assembly can serve as an end plate component of a compression assembly for applying compressive force to an end of each fuel cell stack in the array.

Having a passage of one fuel cell fluid penetrate a layer that defines a chamber for another fuel cell fluid may seem to add complexity and a need for additional seals. However, the construction of the layered assembly effectively allows the penetrating portions of the appropriate passages to be formed as part of the layer being penetrated. Also, the seals at the penetrations can be effected as part of the overall sealing process of the penetrated layer. As a result, use of the layered assembly can simplify manufacture and reduce the number of parts required.

Generally, the layered assembly comprises multiple layers and chambers, for example, a substantially planar first layer adjacent the ends of the fuel cell stacks in the array, a substantially planar second layer adjacent the first layer, the second and first layers defining a first chamber therebetween, and a substantially planar third layer adjacent the second layer, the third and second layers defining a second chamber therebetween. Additionally, the assembly comprises a set of passages connecting the chambers to fluid ports, for example, a first fluid passage penetrating the second and third layers and fluidly connecting a first fluid port to the first chamber and a second fluid passage penetrating the third layer and fluidly connecting a second fluid port to the second chamber. Also, the assembly comprises a set of passages connecting the chambers to internal manifold ports (for connecting to the internal manifolds of the fuel cell stacks), for example, a first manifold passage penetrating the first layer and fluidly connecting the first chamber to a first fluid internal manifold port, and a second manifold passage penetrating the first and second layers and fluidly connecting the second chamber to a second fluid internal manifold port.

As used herein, a layer is considered to be substantially planar if the mating surfaces of the layer are essentially planar or if the boundary between chambers is essentially planar. The surfaces of the layers that define the chambers necessarily cannot lie in the same planes as the mating surfaces of the layers. Further, it is preferred but not necessary for the chamber walls to be parallel and planar. The chamber could for instance have tapered walls.

The layered manifold assembly can be used when the array simply comprises a single fuel cell stack. For instance, the assembly might desirably be used when flow reversal of a fluid is required through the flow fields of fuel cells in a single stack. Alternatively, the assembly is desirably used in arrays comprising more than one internally manifolded fuel cell stack. In such cases, the assembly may comprise a manifold passage and an internal manifold port for connecting each internal manifold of each fuel cell stack to each chamber (i.e., may comprise more than one first manifold passage, second manifold passage, first fluid internal manifold port, and second fluid internal manifold port).

A layered manifold assembly may comprise additional layers defining additional chambers, additional ports, additional fluid passages, and additional manifold passages wherein the passages penetrate the layers in a like manner. In this way, one layered assembly can have a plurality of fluids connected to a plurality of ports for distribution to the appropriate internal manifolds in the fuel cell stacks. For instance, the oxidant supply, the coolant supply, and the coolant exhaust can be so connected and distributed using one layered assembly.

A layered manifold assembly may comprise more than one chamber between one pair of adjacent layers, along with additional fluid ports, additional fluid passages and additional manifold passages. Thus, a pair of adjacent layers can define chambers for more than one fuel cell stack fluid. For instance, a pair of adjacent layers can define two chambers, one connected to a fluid supply port, and the other to the fluid exhaust port. In this way, one layered assembly can have a plurality of fluids connected to a plurality of ports for distribution to the appropriate internal manifolds in the fuel cell stacks. For instance, the oxidant exhaust, the fuel supply, and the fuel exhaust can be so connected and distributed using one layered assembly.

An advantage of the layered assembly is that the cross sectional area for fluid flow in one or more chambers can be greater than that of an equivalent pipe having a diameter equal to the thickness of the assembly. Thus, the improved assembly can result in less resistance to a fluid flow than a pipe of similar thickness.

The fluid ports in the layered manifold assembly are preferably located near the center of the plane of the assembly in the outermost layer. However, the fluid flowing through fluid passages in thin layered assemblies can impinge on an adjacent layer on entering a chamber thereby resisting the flow. In such a case, it may be advantageous to have the fluid passage penetrate further into the assembly, through another adjacent layer. However, if adjacent layers have been further penetrated by the fluid passage, certain volumes between neighboring layers may need to be suitably fluidly isolated or sealed to prevent fluids from mixing.

The layered manifold assembly is suitable for use in fuel cell arrays in which the internally manifolded fuel cell stacks comprise solid polymer fuel cells. The assembly is particularly suited for use with internally manifolded fuel cell stacks having internal manifolds located on opposite sides of the stacks, such as with stacks of fuel cells comprising linear fluid flow fields.

The layered manifold assembly can also be equipped with valves for controlling fluid flow in some or all of the manifold passages that are fluidly connected to one of the chambers. In some manifold configurations, if these manifold passages are then suitably fluidly connected via manifold ports to one or more internal manifolds in the fuel cell stacks, by suitably opening and closing valves in such an assembly, the manifold passages can be sealed to allow flow of a fluid in either direction through the internal manifolds. Thus, periodic reversing of a fluid flow in fuel cell stacks in an array can be achieved. For instance, using an appropriate manifold configuration and valve arrangement, coolant or oxidant or fuel flow reversing can be achieved.

Preferably, each of the valves at each of the manifold passages can be operated independently. In that way, the flow direction of each fluid to each fuel cell stack can be controlled independently.

Therefore, a method of periodically reversing the flow of a fluid in such a manifolded fuel cell array comprises:

(a) incorporating a supply manifold assembly in the array, the supply manifold assembly comprising a pair of adjacent substantially planar layers defining a supply chamber therebetween; a supply passage in the supply manifold assembly for fluidly connecting a fluid supply to the supply chamber; supply manifold passages for fluidly connecting the supply chamber via internal manifold ports alternately to each of a pair of manifolds in each stack in the array; and valves for controlling fluid flow in each of the supply manifold passages;

(b) incorporating an exhaust manifold assembly in the array, the exhaust manifold assembly comprising a pair of adjacent substantially planar layers defining an exhaust chamber therebetween; an exhaust passage in the exhaust manifold assembly for fluidly connecting a fluid exhaust to the exhaust chamber; exhaust manifold passages for fluidly connecting the exhaust chamber via internal manifold ports alternately to each of the pair of manifolds in each stack in the array; and valves for controlling fluid flow in each of the exhaust manifold passages;

wherein each of the pair of internal manifolds is fluidly connected to opposite ends of flow fields for said fluid in each fuel cell; and the valves are operated so that one of the pair of internal manifolds in each fuel cell stack is fluidly connected to the supply chamber but not to the exhaust chamber; and (c) at periodic intervals, adjusting the settings of the valves whereby flow of the fluid through the flow fields is periodically reversed. Preferably the flow through each of the pair of internal manifolds, in each fuel cell stack in the array, is reversed at different times.

In another embodiment, a layered manifold assembly for an array comprises at least one internally manifolded fuel cell stack. The assembly has fluid ports and internal manifold ports for fluid connection to the internal manifolds in each fuel cell stack in the array. The layered manifold assembly comprises:

a first layer adjacent one end of each of the at least one fuel cell stack;

a second layer adjacent the first layer, the second and first layers defining a first chamber therebetween;

a third layer adjacent the second layer, the third and second layers defining a second chamber therebetween;

a first fluid passage penetrating the second and third layers and fluidly connecting a first fluid port to the first chamber;

a second fluid passage penetrating the third layer and fluidly connecting a second fluid port to the second chamber;

a first manifold passage penetrating the first layer and fluidly connecting the first chamber to a first fluid internal manifold port; and a second manifold passage penetrating the first and second layers and fluidly connecting the second chamber to a second fluid internal manifold port.

BRIEF DESCRIPTION OF THE DRAWINGS

FIG. 1b is a side view of the array in FIG. 1a. Again, the view is in a plane perpendicular to the plane of the layered manifold assemblies and stacked fuel cells, orthogonal to the view in FIG. 1a.

DETAILED DESCRIPTION OF PREFERRED EMBODIMENTS

Figure 1A:
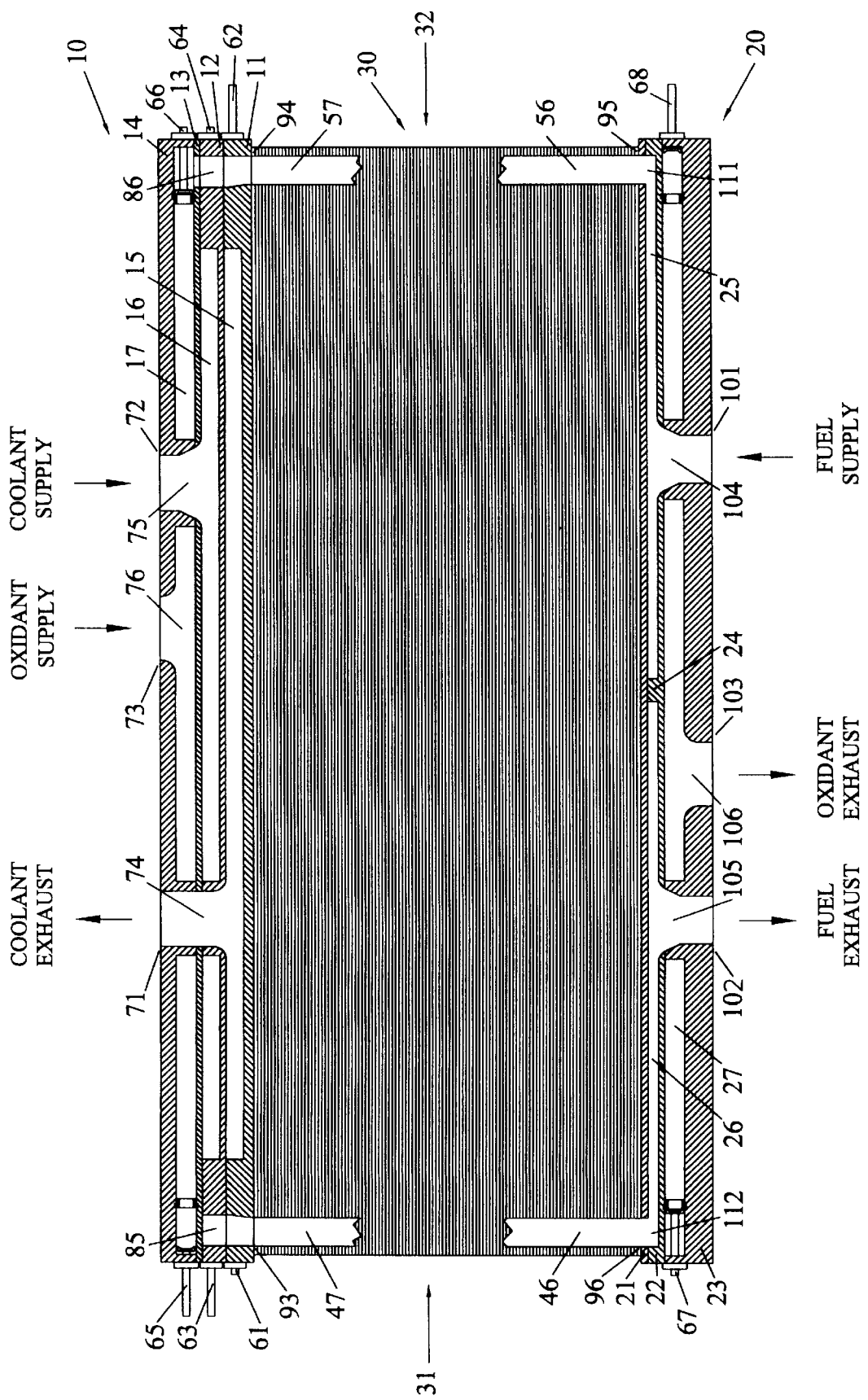
FIG. 1a is a cross-sectional top view of an array of fuel cell stacks having layered manifold assemblies. The view is in a plane perpendicular to the plane of the layered manifold assemblies and the stacked fuel cells.

A layered manifold assembly may be advantageously employed in an array with only one fuel cell stack, particularly if fluid flow reversal is desired in the flow fields of the fuel cells. Alternatively, a layered manifold assembly is preferably employed in an array comprising multiple fuel cell stacks. The layered manifold assembly could be interposed between the ends of a pair of stacks or as a center manifold in an elongated stack. FIGS. 1–4 illustrate an array of fuel cell stacks that employs layered manifold assemblies that also serve as compression end plates at each end of the stacks. This embodiment illustrates some features and advantages of a layered assembly, including incorporation of a mechanism for accomplishing periodic reversal of fluid flows. FIG. 1a shows a cross-sectional view near the center of an array comprising four fuel cell stacks where the view is in a plane perpendicular to the layered manifold assemblies and stacked fuel cells. In actual use, the fuel cell array shown is preferably oriented such that the view in FIG. 1a represents a top view. However, for simplicity in the following description, references to orientation are made with respect to the orientation as shown in FIG. 1a. Thus, upper layered manifold assembly 10 and lower layered manifold assembly 20 appear at either end of fuel cell stack array 30. Upper layered manifold assembly 10 serves as a compression end plate for each stack in the array and as a manifold for the oxidant (air) supply, coolant supply, and coolant exhaust for each stack in the array. Lower layered manifold assembly 20 serves as the other compression end plate for each stack in the array and as a manifold for the fuel supply, fuel exhaust, and oxidant exhaust for each stack in the array. In the depicted embodiment, periodic reversal of the coolant and the oxidant flows can be conveniently accomplished.

Stack layout

In FIG. 1a, four fuel cell stacks are aligned side-by-side in a single row, the row being normal to the plane of the paper. Another cross-sectional view of the fuel cell stack arrangement is shown in FIG. 1c, where the view is in a plane parallel to the plane of the layered manifold assemblies and with the section taken through four fuel flow field plates 40 of the stacks. The stacks in the array are roughly rectangular and employ substantially linear flow fields in each of the fuel, oxidant, and coolant fluid flow field plates. The linear fuel flow field 42 can be seen in FIG. c. The view also shows the layout of the pairs of internal manifolds for each stack. Fluid access to one end of each stack's fuel, oxidant, and coolant flow fields is provided at fuel, oxidant, and coolant internal manifolds 46, 47, and 48 respectively. Fluid access to the other end of each stack's fuel, oxidant, and coolant flow fields is provided at fuel, oxidant, and coolant internal manifolds 56, 57, and 58 respectively. As shown in FIG. 1c, oxidant internal manifolds 47 and 57 have been positioned to be slightly lower than the flow fields (e.g., flow field 42) at both ends. This arrangement facilitates the drainage of liquid water from the oxidant exhaust, which will issue alternately from each end of the oxidant flow field when flow switching of the oxidant stream is used. A series of tensioned metal compression bands 51 pass between the stacks, in order to provide compression force on layered manifold assemblies 10, 20, which act as end plates, and the fuel cells interposed between them. Each compression band is secured at one end to upper layered manifold assembly 10 and at the other end to lower layered manifold assembly 20. The four fuel cell stacks and the compression bands are electrically isolated from one another by electrical isolators which extend in a direction normal to FIG. 1c (not shown) over the height of the stacks.

Upper layered manifold assembly

Returning to FIG. 1a, upper layered manifold assembly 10 comprises a substantially planar first layer 11, which is adjacent to substantially planar second layer 12. Layers 11 and 12 define a coolant exhaust chamber or plenum 15 therebetween. Second layer 12 is also adjacent to substantially planar third layer 13 and together these layers define a coolant supply chamber or plenum 16 therebetween. Third layer 13 is also adjacent to substantially planar fourth layer 14, with layers 13 and 14 defining an oxidant supply or plenum 17 therebetween. Each of the coolant exhaust chamber 15, coolant supply chamber 16, and oxidant supply chamber 17 is fluidly connected to coolant exhaust port 71, coolant supply port 72, and oxidant supply port 73 respectively by coolant exhaust passage 74, coolant supply passage 75, and oxidant supply passage 76 respectively. Coolant exhaust passage 74 therefore penetrates second, third, and fourth layers 12, 13, 14. Coolant supply passage 75 therefore penetrates third and fourth layers 13, 14. Finally, oxidant supply passage 76 only penetrates the fourth layer 14.

In FIG. 1a, the ends of each substantially linear flow field in each stack and hence the internal manifolds for each fuel cell stack are located generally along opposite sides 31 and 32 of the array 30. Coolant exhaust chamber 15 is fluidly connected to each pair of coolant internal manifolds 48, 58 (located on opposite sides 31 and 32 respectively and shown in FIG. 1c) at coolant inteknal manifold ports 91, 92 respectively (not shows in this FIG. but located on opposite sides 31 and 32 respectively) by coolant exhaust manifold passages 81, 82 (not shown in this FIG. but located on opposite sides 31 and 32 respectively). Coolant internal manifold ports 91, 92 connect with coolant internal manifolds 48, 58 at the uppermost plate in each of the four fuel cell stacks. Coolant exhaust manifold passages 81, 82 therefore penetrate only first layer 11.

In a like manner, coolant supply chamber 16 is also fluidly connected to each pair of coolant internal manifolds 48, 58 (located on opposite sides 31 and 32 respectively and shown in FIG. 1c) at coolant internal manifold ports 91, 92 respectively (not shown in this FIG. but located on opposite sides 31 and 32 respectively) by coolant supply manifold passages 83, 84 (not shown in this FIG. but located on opposite sides 31 and 32 respectively). Coolant exhaust manifold passages 83, 84 therefore penetrate first and second layers 11, 12.

Thus, both the coolant supply and exhaust chambers 15, 16 are fluidly connected to each pair of coolant internal manifolds 48, 58. In order to effect proper flow of coolant through internal manifolds of the fuel cell stacks, coolant flow in coolant supply and exhaust manifold passages 81, 82, 83, 84 can be controlled by appropriately opening and closing valves 61, 62, 63, 64. For instance, having valves 61 and 64 closed and valves 62 and 63 open, allows coolant to flow through coolant supply port 75 into the coolant manifolds 48 on side 31, through the coolant flow fields in the fuel cell stacks, into coolant manifolds 58 on side 32, and finally out through coolant exhaust port 74. A layer structure and a valve configuration providing for proper flow of the coolant are shown in more detail later in FIGS. 2a and 3a.

Fluid connections of oxidant supply port 73 to oxidant internal manifolds 47, 57 are similar to those of the coolant above. Oxidant supply chamber 17 is fluidly connected to each pair of oxidant internal manifolds 47, 57 at oxidant internal manifold ports 93, 94 respectively by oxidant supply manifold passages 85, 86.

Lower layered manifold assembly

Lower layered manifold assembly 20 comprises a substantially planar first layer 21, which is adjacent to substantially planar second layer 22. Layers 21 and 22 define both a fuel supply chamber 25 and a fuel exhaust chamber 26 therebetween. The two chambers are separated by barrier 24. Second layer 22 is also adjacent to substantially planar third layer 23 and layers 22 and 23 define an oxidant exhaust chamber 27 therebetween.

In this embodiment valves for effecting fuel flow reversal are not included. Thus, fuel supply port 101 is fluidly connected to fuel supply passage 104 which in turn is fluidly connected to fuel supply chamber 25 and fuel supply manifold passages 111 which then connects to fuel internal manifolds 56 at fuel internal manifold ports 95, thereby providing a flow path for fuel into the fuel flow field plates 40 (not shown in FIG. 1a). Fuel exits the flow field plates 40 through fuel internal manifolds 46 which connect to fuel exhaust manifold passages 112 at fuel exhaust manifold ports 96, which then connect to fuel exhaust chamber 26, which then connects to fuel exhaust passage 105 leading to fuel exhaust port 102.

The fluid connections of the oxidant exhaust port 103 to oxidant internal manifolds 47, 57 are similar to those of the oxidant supply above, except that they appear in lower layered manifold assembly 20. Thus, oxidant exhaust port 103 is fluidly connected by oxidant exhaust passage 106 to oxidant exhaust chamber 27 which in turn is fluidly connected to each pair of oxidant internal manifolds 47, 57 at oxidant internal manifold ports 97, 98 (not shown in this FIG. but located on opposite sides 31 and 32 respectively) respectively by oxidant exhaust manifold passages 113, 114 (not shown in this FIG. but located on opposite sides 31 and 32 respectively).

Thus, both the oxidant supply and exhaust chambers 17, 27 are fluidly connected to each pair of oxidant internal manifolds 47, 57. In order to effect proper flow of oxidant through internal manifolds of the fuel cell stacks, oxidant flow in oxidant supply and exhaust manifold passages 113, 114, 85, 86 can be controlled by appropriately opening and closing valves 65, 66, 67, 68. A layer structure and a valve configuration providing for proper flow of the oxidant may be similar to that of the coolant supply and exhaust manifold passages.

Figure 1B:
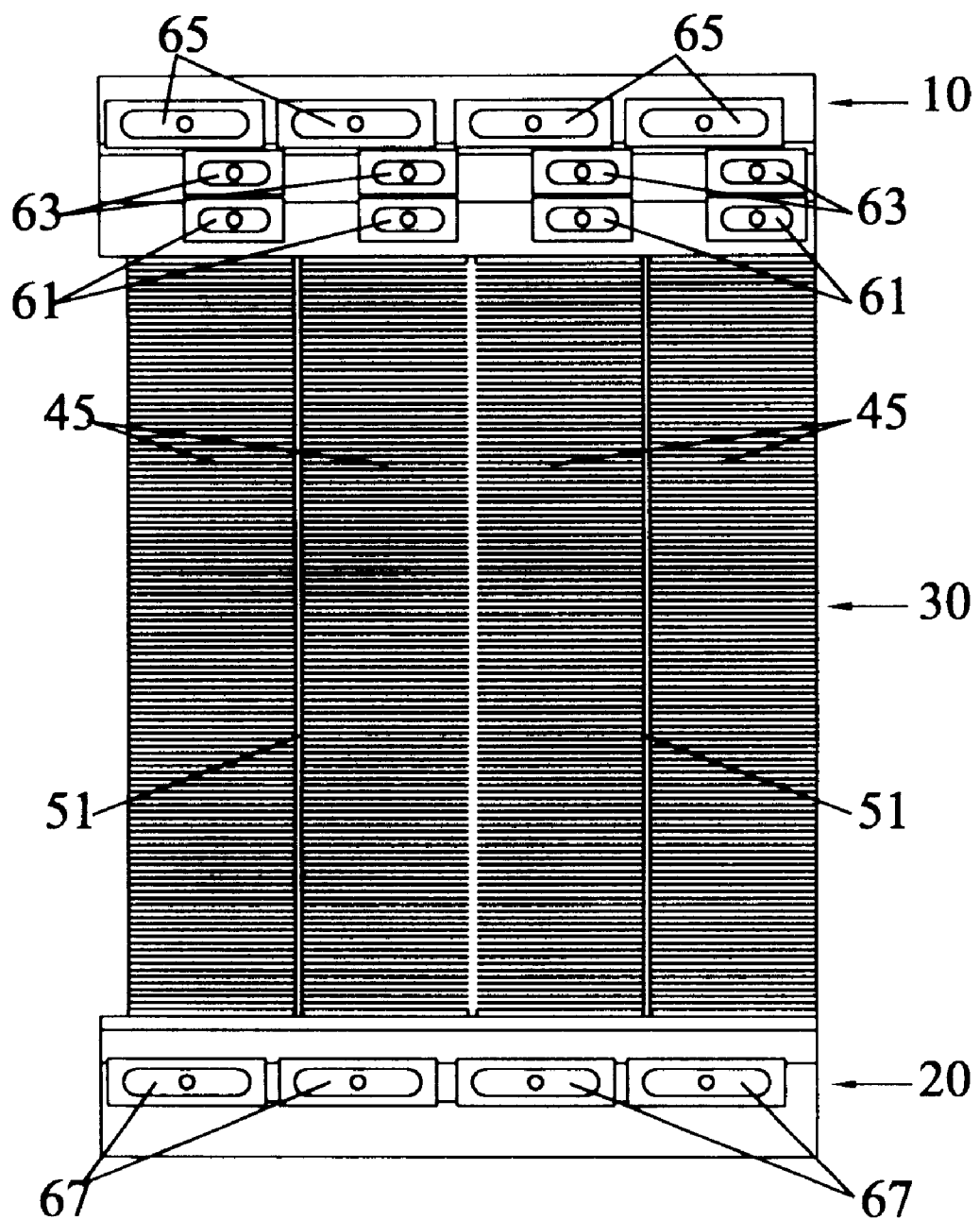
Figure 1C:
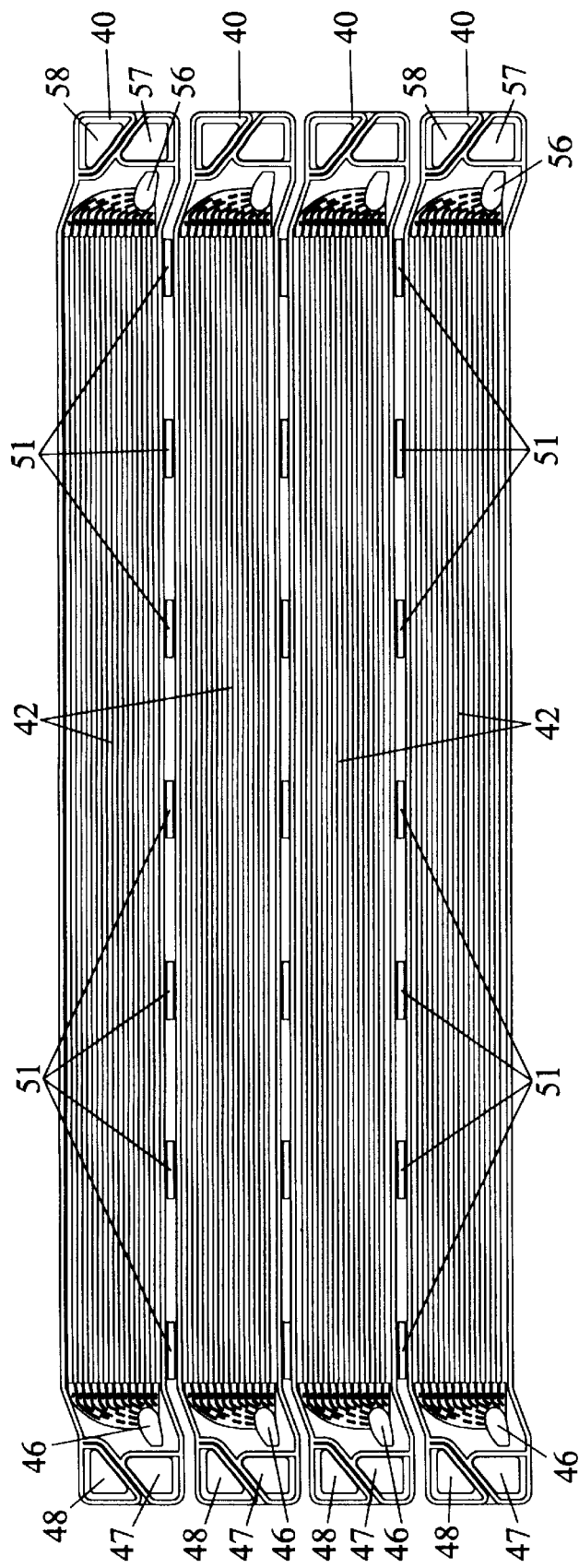
FIG. 1c is a cross-sectional view of the fuel cell stacks in FIG. 1a in a plane parallel to the plane of the layered manifold assemblies and stacked fuel cells. The view shows the side-by-side stack arrangement and the layout of the internal manifolds for each stack.

FIG. 1b is a view of side 31 of the array of fuel cell stacks in FIG. 1a. This view shows the relative location of valves 61, 63, 65, 67. Also shown is the location of compression bands 51, which are disposed between the fuel cell stacks 45 of the array.

Schematic diagram to illustrate flow paths in layered manifold assemblies

Figure 2A:
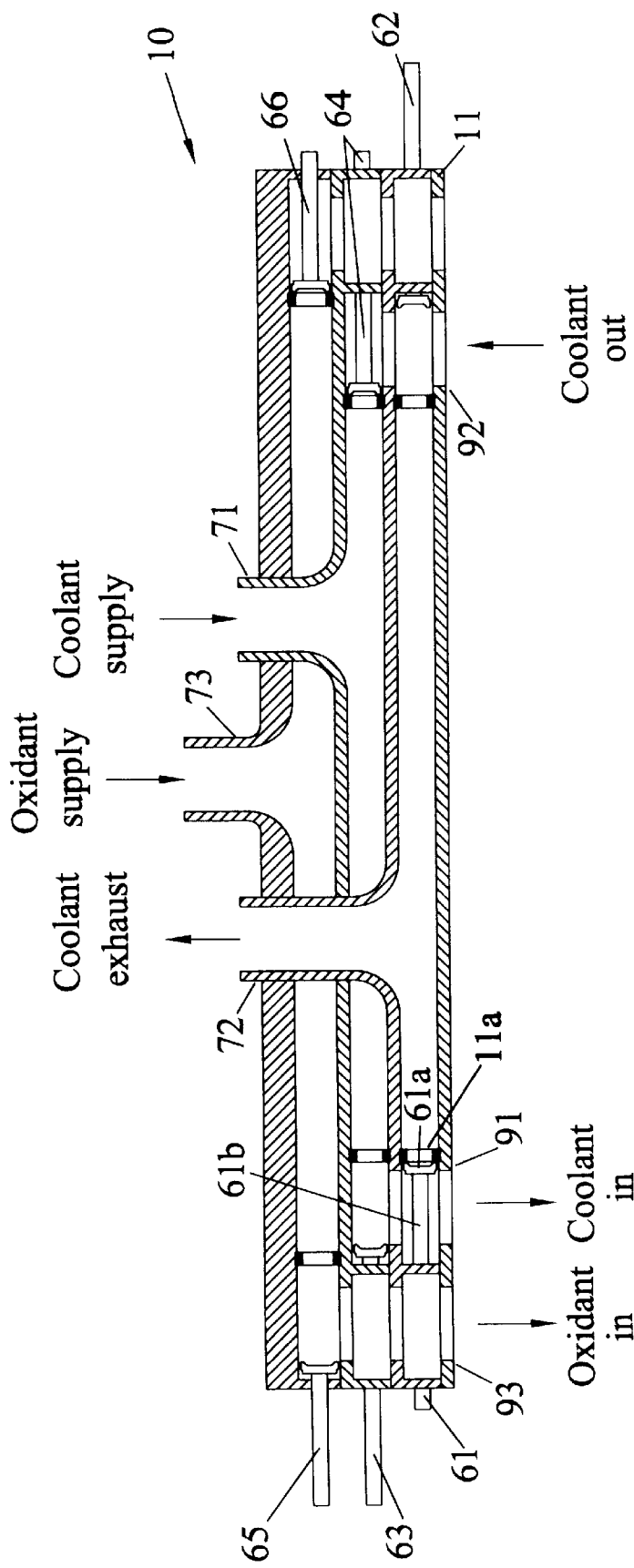
FIG. 2a is a schematic cross-sectional diagram of the upper layered manifold assembly in FIGS. 1a, 1b and 1c, which is connected to common oxidant supply, coolant supply, and coolant exhaust for the array.

FIG. 2a is a schematic diagram of upper layered manifold assembly 10 of FIG. 1, which is connected to a common oxidant supply, coolant supply, and coolant exhaust for the array. Valves 61 through 66 control the flow of the various fluids to and from the fuel cell stacks. Each valve has a similar construction to exemplary valve 61. Valve 61 comprises a rectangular sealing face 61a and a stem 61b actuated from outside the fuel cell stack array. Face 61a seals against a rectangular seat 11a fixed to layer 11. Seat 11a comprises a generally rectangular orifice.

As shown, coolant supply and exhaust valves 62 and 63 are open while coolant supply and exhaust valves 61 and 64 are closed. Thus, coolant flows through coolant supply port 72 to coolant internal manifold ports 91, which lead into the coolant internal manifolds 48 (not shown). Coolant then flows through coolant flow fields in the fuel cell stacks, into coolant internal manifolds 58 (not shown) to coolant internal manifold ports 92 and out through coolant exhaust port 71. Coolant flow is reversed by closing valves 62 and 63 while opening valves 61 and 64.

In FIG. 2a, valve 65 is open and valve 66 is closed. Thus, oxidant flows through oxidant supply port 73 to oxidant internal manifold ports 93, which lead into the oxidant internal manifolds 47 (not shown). Oxidant then flows through oxidant flow fields in the fuel cell stacks, into oxidant internal manifolds 57 (not shown) to oxidant internal manifold ports 98 and out through oxidant exhaust port 103 in lower layered manifold assembly shown in FIG. 2b. Oxidant flow is reversed by closing valve 65 and opening valve 66.

Figure 2B:
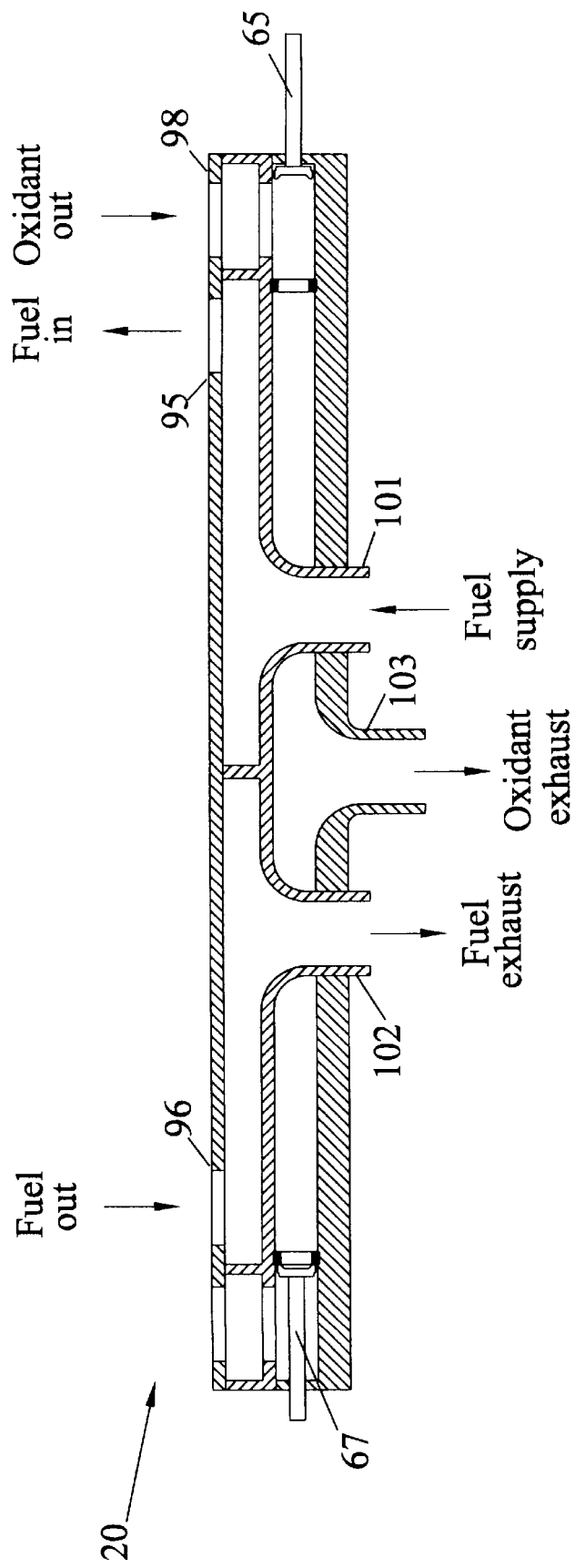
FIG. 2b is a schematic cross-sectional diagram of the lower layered manifold assembly in FIGS. 1a, 1b and 1c, which is connected to common oxidant exhaust, fuel supply, and fuel exhaust for the array.

FIG. 2b is a schematic diagram of lower layered manifold assembly 20 of FIG. 1, which is connected to a common oxidant exhaust, fuel supply, and fuel exhaust for the array. As shown, valve 67 is closed and valve 68 is open and is thus properly configured with respect to valves 65 and 66 in FIG. 2a. Thus, oxidant flows from oxidant internal manifolds 57 (not shown) to oxidant internal manifold ports 98 and out through oxidant exhaust port 103 in lower layered manifold assembly 20.

Fuel enters via fuel supply port 101, flows to fuel internal manifolds 56 at fuel internal manifold ports 95, through fuel flow field plates, into fuel internal manifolds 46 and to fuel internal manifold ports 96, and out through fuel exhaust port 102.

In the schematics of FIGS. 2a and b, one set of valves for controlling flow to one fuel cell stack is shown. However, the fuel cell array 30 of FIG. 1 comprises four stacks and four sets of controlling valves. Since there is generally a reduction in power output from any given fuel cell stack for a short period following a flow reversal, it can be advantageous not to reverse flow in every fuel cell stack at once. Since the sets of valves for controlling flow to each individual fuel cell stack can be operated independently, preferably only one set of valves is switched at a time, resulting in a power reduction from only one quarter of the array at a time. Preferably then, the four sets of valves controlling the flows to the four fuel cell stacks are switched sequentially, pausing long enough between switching each set such that the previously switched fuel cell stack has had a chance to recover to full power. Thus, power output from the array can always be maintained above 75% of normal during the flow reversals.

Upper layers

Figure 3A:
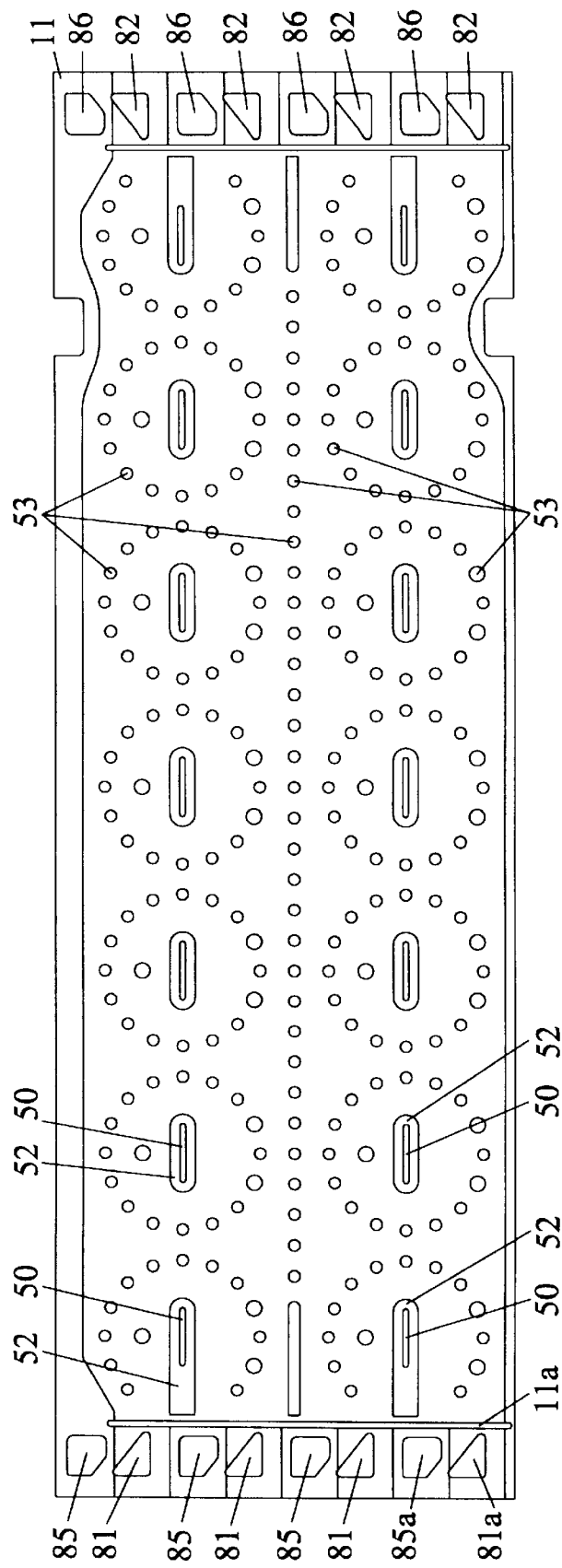
FIG. 3a is a top view of the first layer of the upper layered manifold assembly of FIGS. 1a, 1b and 1c, which defines the bottom of the coolant exhaust chamber.

FIGS. 3a through 3d show views of each layer making up upper layered manifold assembly 10 of FIG. 1. FIG. 3a shows a top view of first layer 11, which defines the bottom of coolant exhaust chamber 15. First layer 11 is essentially a solid molded plate in which various chambers, passages, holes, and supports have been formed. More detail is shown in the vicinity of coolant exhaust manifold passage 81a which is exemplary of how each manifold passage is isolated from other manifold passages. With respect to the view shown in FIG. 3a, valve seat 11a bounds manifold passage 81a on the right (and is closed by sealing face 61a of valve 61 in FIG. 2a). The walls of oxidant supply manifold passages 85a extend over the entire thickness of first layer 11 and thus bound manifold passage 81a above. Finally, the outer edges of first layer 11 bound manifold passage 81a on the left and below.

The locations of the various fluid manifold passages 81 through 86 are shown in FIG. 3a. (Note that coolant supply manifold passages 83 and 84 merge with coolant exhaust passages 81 and 82 respectively at second layer 12.) Openings 50 for the compression bands 51 are provided and are surrounded by supports 52 formed in the first layer 11 to support the adjacent layers 11 and 12 from flexing under compression. Supports 52 extend over the entire thickness of layer 11. Additional cylindrical supports 53 are also formed in layer 11 and also extend over the entire thickness to provide support against flexing. (For clarity, the presence of the supports 52 and 53 had been omitted in FIG. 1a.)

Figure 3B:
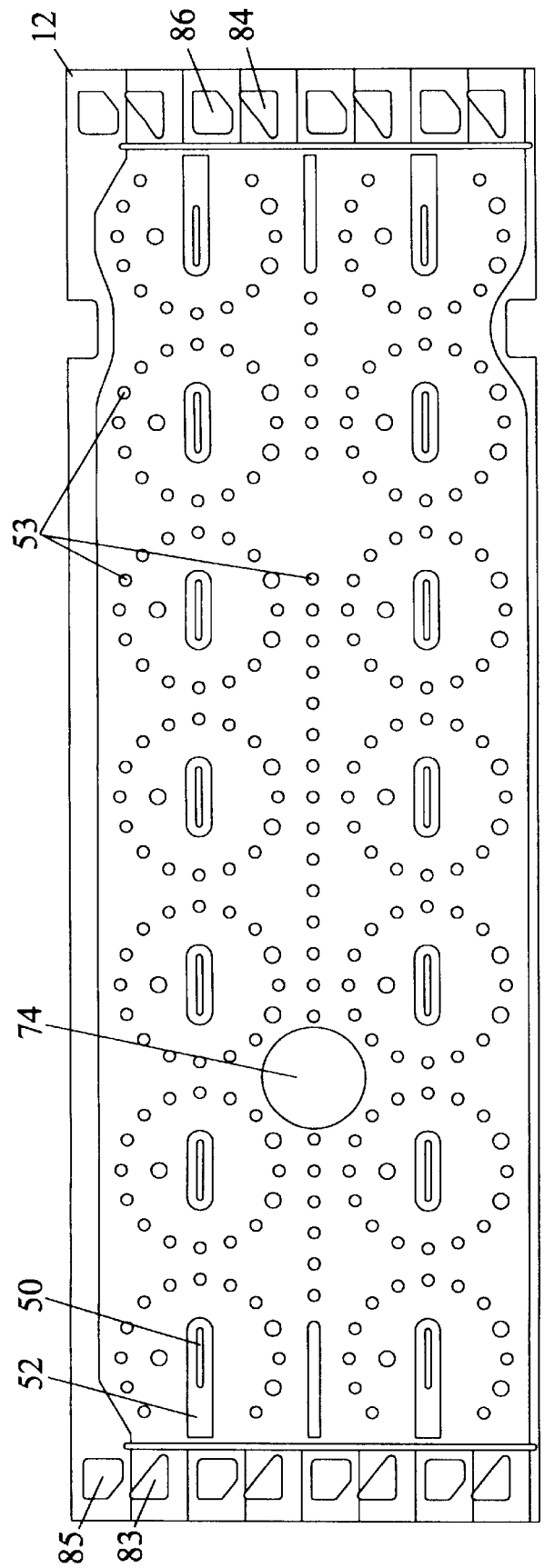
FIG. 3b is a top view of the second layer of the upper layered manifold assembly of FIGS. 1a, 1b and 1c, which separates the coolant exhaust chamber from the coolant supply chamber and defines the top and bottom of each respectively.
Figure 3C:
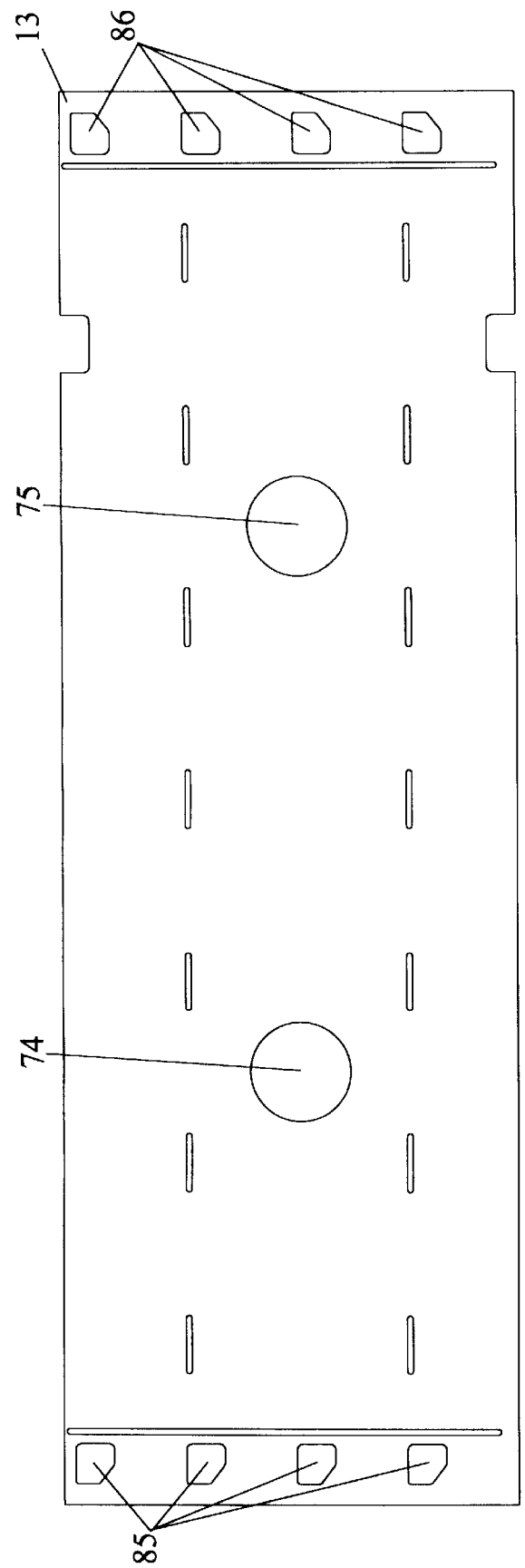
FIG. 3c is a top view of the third layer of the upper layered manifold assembly of FIGS. 1a, 1b and 1c, which separates the coolant supply chamber from the air supply chamber and defines the top and bottom of each respectively.
Figure 3D:
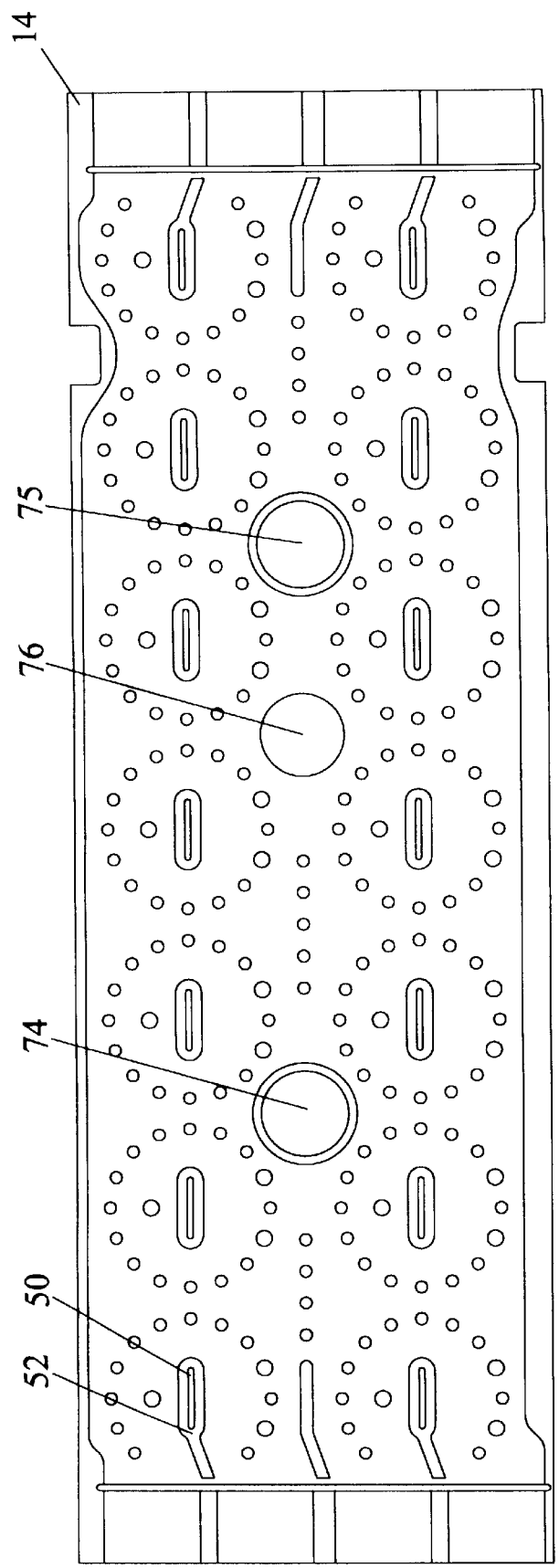
FIG. 3d is a bottom view of the fourth layer of the upper layered manifold assembly of FIGS. 1a, 1b and 1c, which defines the top of the air supply chamber.

FIG. 3b shows a top view of second layer 12 which separates coolant exhaust chamber 15 from coolant supply chamber 16 and defines the top and bottom of each chamber respectively. The features formed therein are similar to those in FIG. 3a and the reference numerals identify items as defined in the preceding. In a like manner, FIG. 3c shows a top view of third layer 13 which separates coolant supply chamber 16 from oxidant supply chamber 17 and defines the top and bottom of each chamber respectively. FIG. 3d shows a bottom view of fourth layer 14, which defines the top of oxidant supply chamber 17.

Lower layers

Figure 4A:
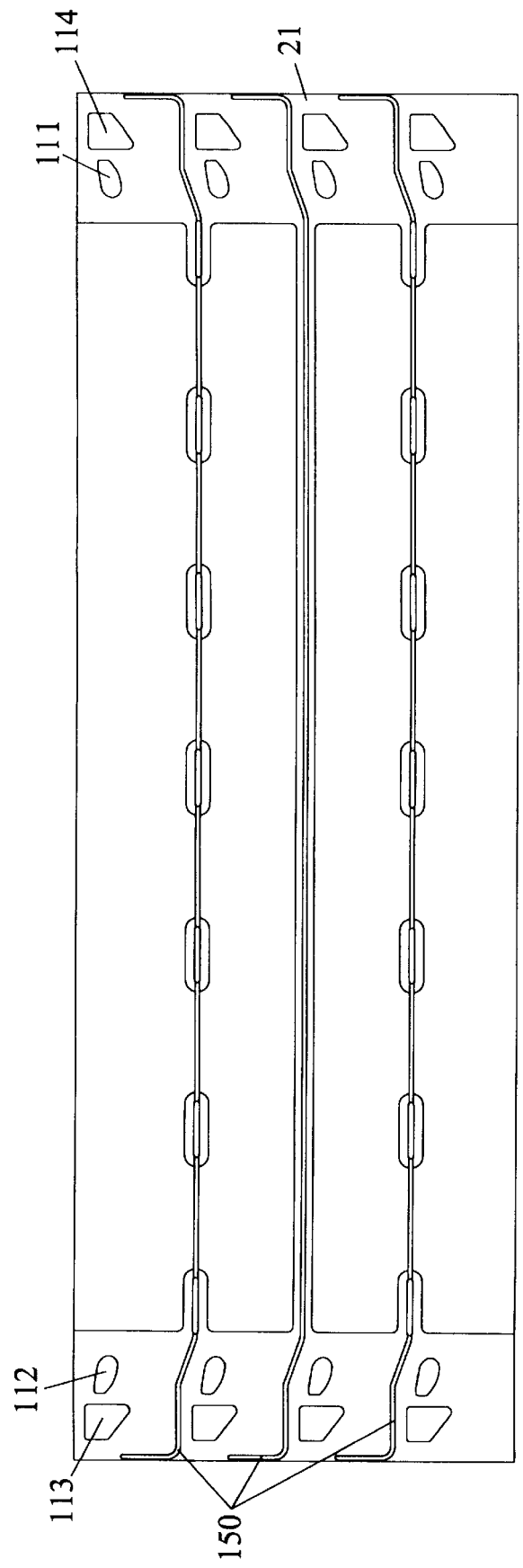
FIG. 4a is a bottom view of the first layer of the lower layered manifold assembly end plate in FIGS. 1a, 1b and 1c, which defines the top of the fuel supply and exhaust chambers.
Figure 4B:
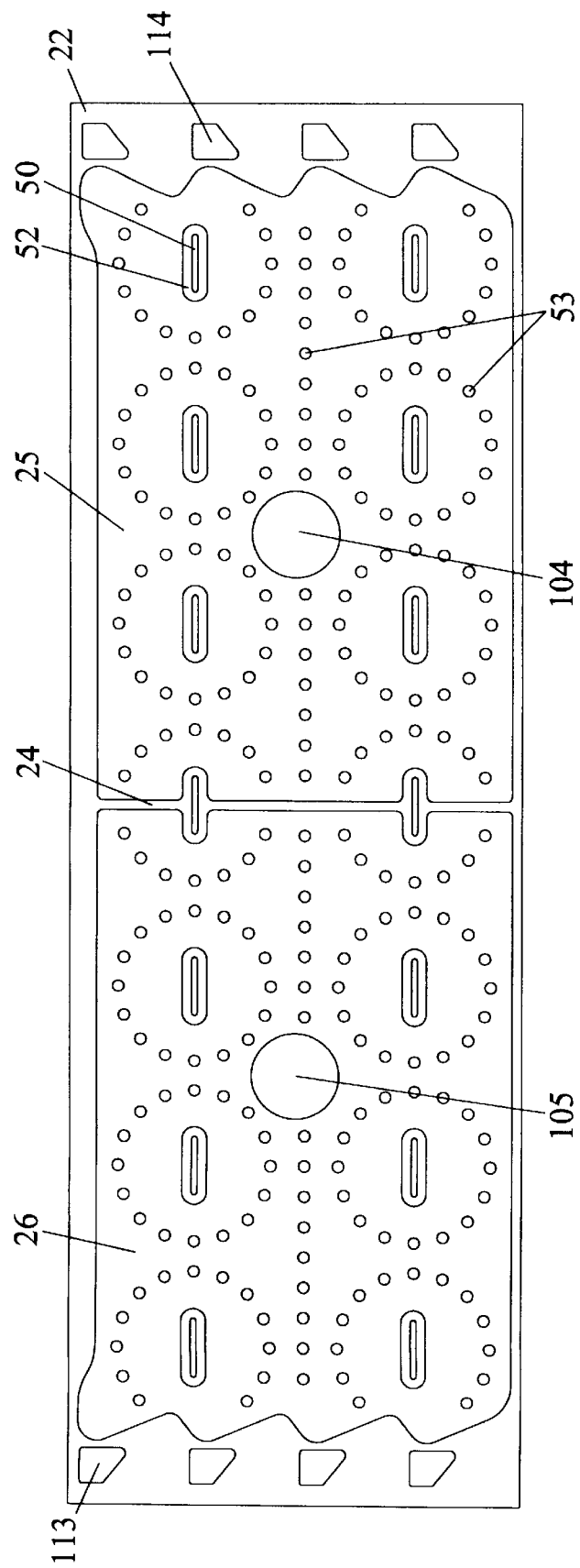
FIG. 4b is a bottom view of the second layer of the lower layered manifold assembly of FIGS. 1a, 1b and 1c, which separates the fuel supply and exhaust chambers from the oxidant exhaust chamber and defines the bottom and top of each respectively.
Figure 4C:
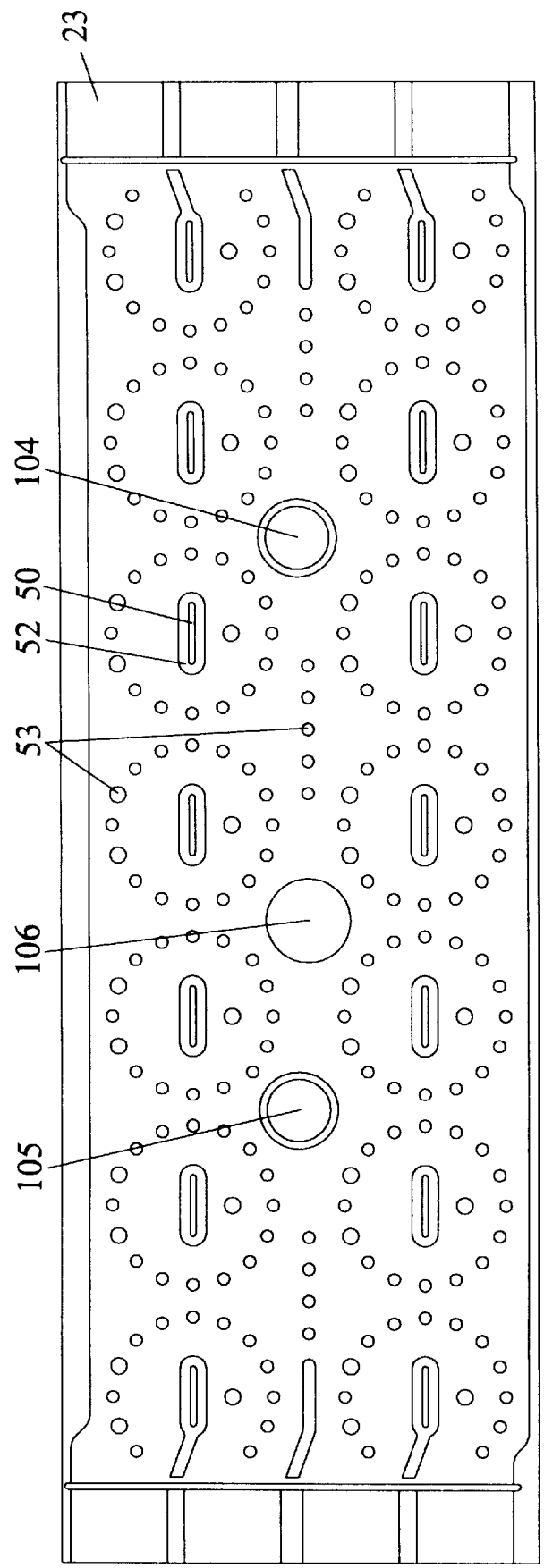
FIG. 4c is a top view of the third layer of the lower layered manifold assembly of FIGS. 1a, 1b and 1c, which defines the bottom of the oxidant exhaust chamber.
Figure 4D:
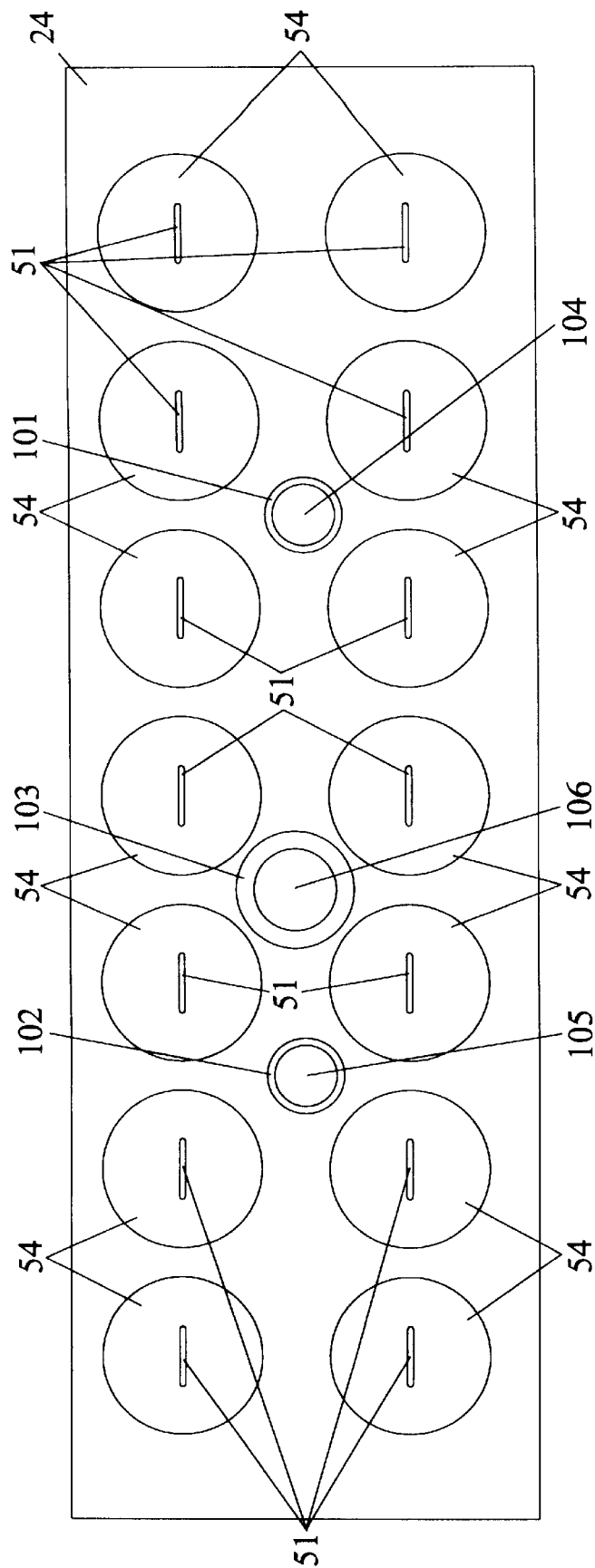
FIG. 4d is a bottom view of the third layer of the lower layered manifold assembly of FIGS. 1a, 1b and 1c. The view shows the arrangement of the resilient compression springs and compression bands.

FIGS. 4a through 4d show views of each layer making up lower layered manifold assembly 20 in FIG. 1. FIG. 4a shows a bottom view (again with respect to FIG. 1) of first layer 21, which defines the top of the fuel supply and exhaust chambers, 25 and 26 respectively. Also shown in FIG. 4a are locating grooves 150 for the electrical isolators which electrically isolate the four fuel cell stacks and the compression bands 51 from one another. FIG. 4b shows a bottom view of second layer 22 which separates fuel supply and exhaust chambers 25, 26 from oxidant exhaust chamber 27 and defines the bottom and top of each chamber respectively. Layer 22 is generally similar to the preceding layers except that it comprises partition 24 to separate fuel supply chamber 25 from fuel exhaust chamber 26. Partition 24 extends over the entire thickness of layer 22. FIG. 4c shows a top view of third layer 23, which defines the bottom of oxidant exhaust chamber 27. Finally, FIG. 4d shows a bottom view of third layer 23 which shows an arrangement of resilient springs 54 and bands 51 that are used to urge the upper and lower manifold assemblies 10, 20 (i.e. end plates) together, compressing the fuel cells.

The layers making up the layered manifold assemblies can be made of any suitable material. In the preceding embodiment, there are numerous complex features formed therein. Thus, it would be preferable to prepare such layers out of a moldable material (e.g. suitably stiff thermoplastic). Such layers can be bonded together if desired into unitary assemblies using a suitable glue or by other conventional means.

While alternative embodiments may be employed, the preceding embodiments of a layered manifold assembly achieve a desirable thin, rectangular parallelepiped shape. Depending on the aspect ratio of the fuel cell array, the thickness of the assemblies can be less than that of pipes having equivalent cross-sectional area for flow. Further, the path length from each common fluid port to each internal manifold in the fuel cell stack is relatively short and is roughly the same for each fuel cell stack. Thus, the resistance to flow is kept relatively low and the fluid pressure and/or flow to each fuel cell stack is similar. Further still, the preceding embodiment is advantageous for purposes of flow switching in that switching valves 61 through 68 are in close proximity to internal manifolds 46 through 48 and 56 through 58. This results in a minimal volume of fluid exhaust that has to be cleared before the fluid supply actually begins to enter the fuel cell flow fields upon reversal.

Alternative embodiment

FIGS. 5a through 5d show an alternative embodiment of a layered manifold assembly for connecting to a common oxidant supply, oxidant exhaust, coolant supply, and coolant exhaust of a fuel cell array. A difference between this embodiment and those shown in FIG. 1 is that oxidant passages connecting oxidant ports to oxidant chambers extend into layers that define coolant chambers. Thus, the oxidant passages penetrate one of those layers. This design can desirably reduce the resistance to flow resulting from the impingement of the oxidant stream on the layer defining the coolant chamber.

Figure 5A:
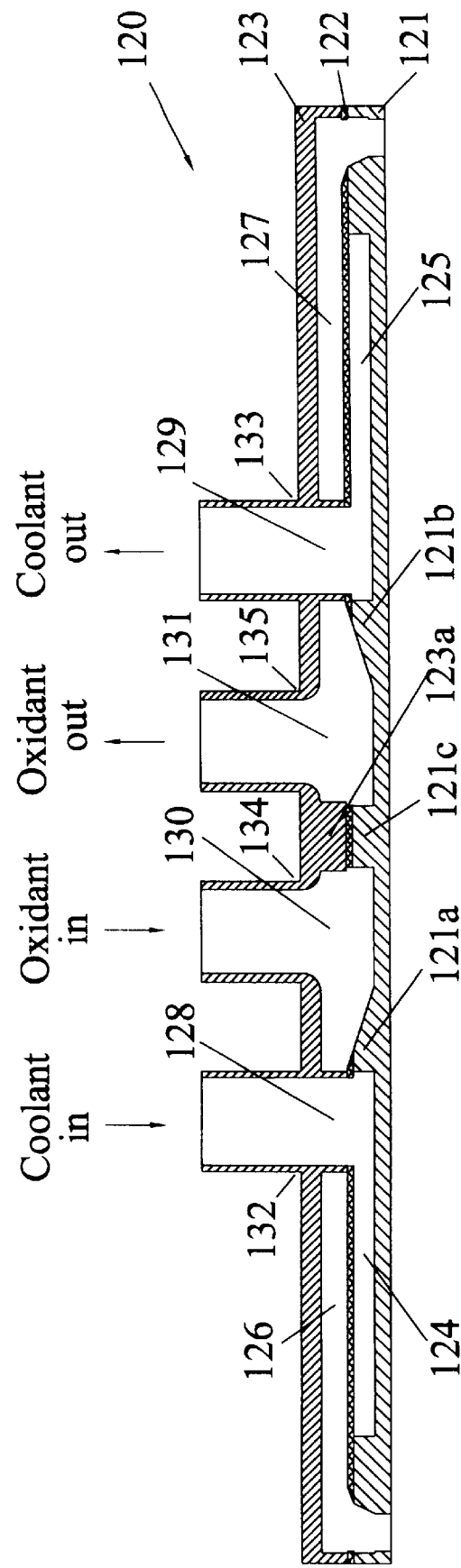
FIG. 5a is a side cross-sectional view of an alternative layered manifold assembly, which is connected to a common oxidant supply, oxidant exhaust, coolant supply, and coolant exhaust for an array. The oxidant supply and exhaust passages penetrate a layer separating the coolant supply and exhaust chambers.

FIG. 5a shows a cross-sectional view of alternative layered manifold assembly 120 comprising first layer 121, second layer 122, and third layer 123. These layers define coolant supply chamber 124, coolant exhaust chamber 125, oxidant supply chamber 126 and oxidant exhaust chamber 127 which are connected by coolant supply passage 128, coolant exhaust passage 129, oxidant supply passage 130 and oxidant exhaust passage 131 passages to coolant supply port 132, coolant exhaust port 133, oxidant supply port 134 and oxidant exhaust port 135 respectively. Both oxidant supply passages 130 and 131 penetrate layer 122. Partitions 121a and 121b separate oxidant supply passage 130 and oxidant exhaust passage 131 from coolant supply chamber 124 and coolant exhaust chamber 125 respectively. Partitions 121c and 123a separate oxidant supply passage 130 from oxidant exhaust passage 131. Other connections, such as those from the chambers to the internal manifolds in the fuel cell stacks, are similar to those shown in FIG. 1 and are not referenced in detail here.

Figure 5B:
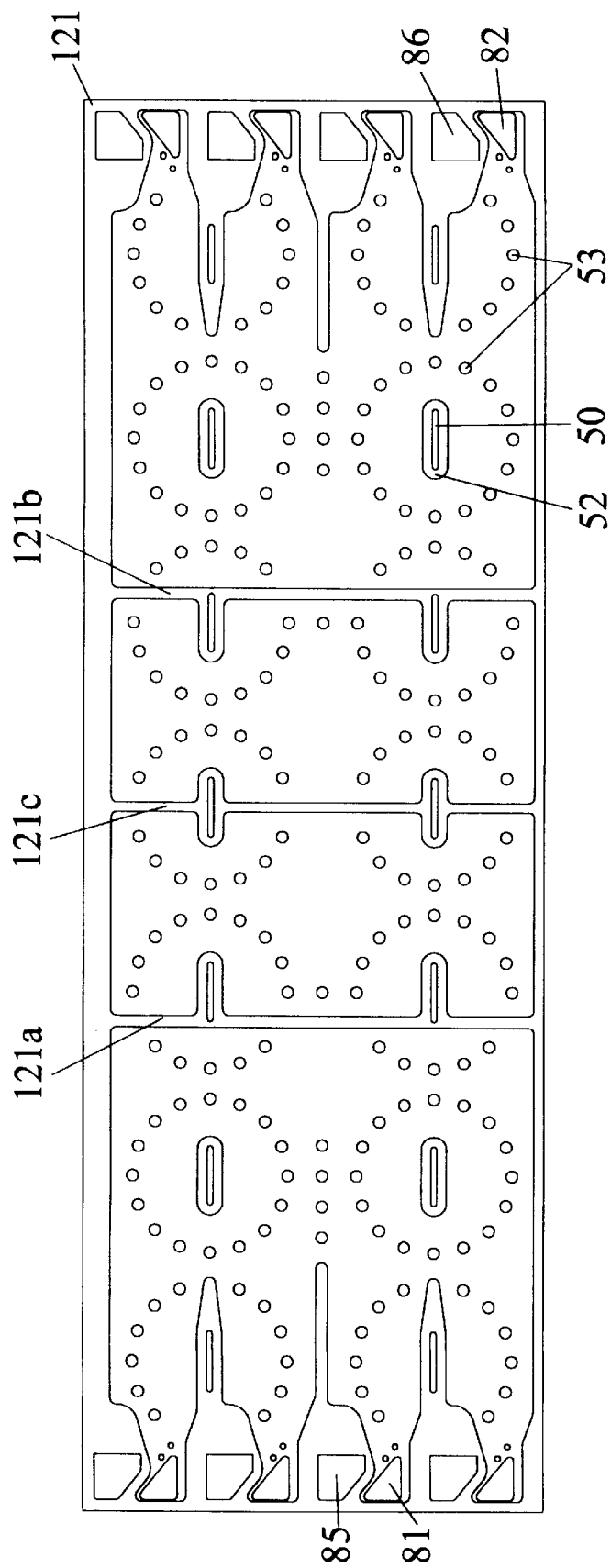
FIG. 5b is a top view of the first layer of the layered manifold assembly of FIG. 5a, which separates the coolant supply and exhaust chambers along with part of the oxidant supply and exhaust passages.

FIG. 5b shows a top view of first layer 121 which defines coolant supply and exhaust chambers, 124 and 125 respectively, along with part of oxidant supply and exhaust passages, 130 and 131 respectively.

Figure 5C:
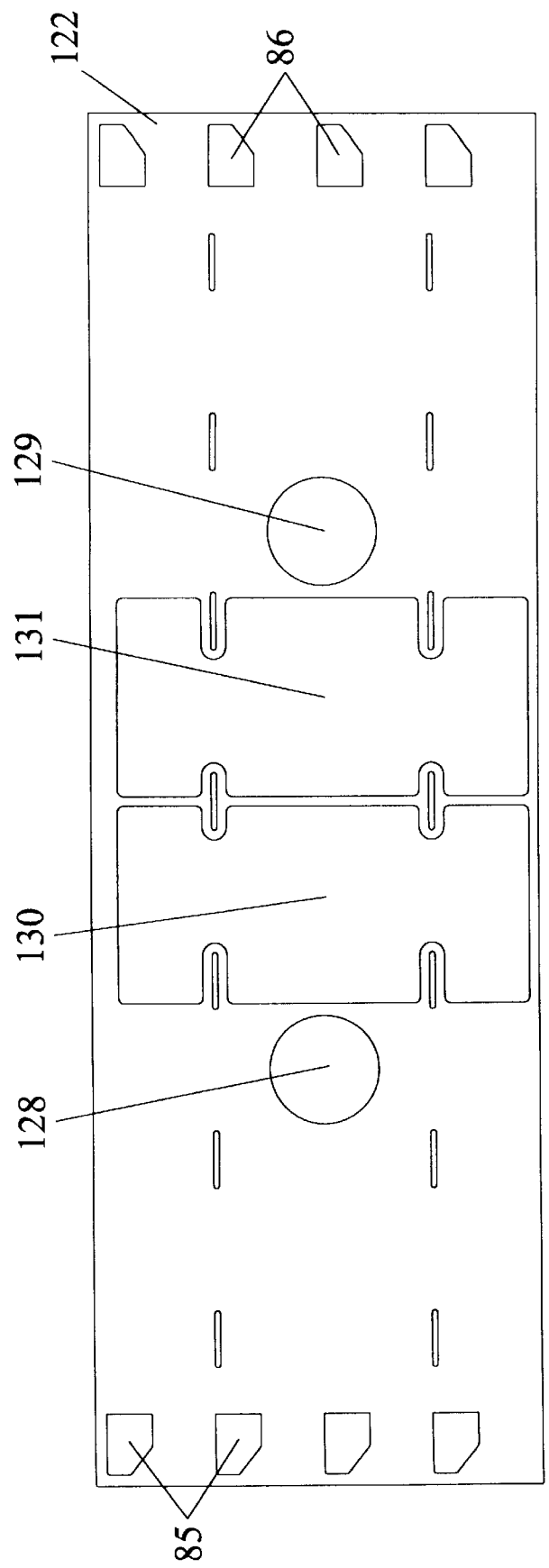
FIG. 5c is a top view of the second layer of the layered manifold assembly of FIG. 5a, which separates the coolant supply and exhaust chambers from the oxidant supply and exhaust chambers and defines the top and bottom of each pair of chambers respectively.

FIG. 5c shows a top view of second layer 122 which separates coolant supply and exhaust chambers, 124 and 125 respectively, from oxidant supply and exhaust chambers, 126 and 127 respectively, and defines the top and bottom of each pair of chambers respectively.

Figure 5D:
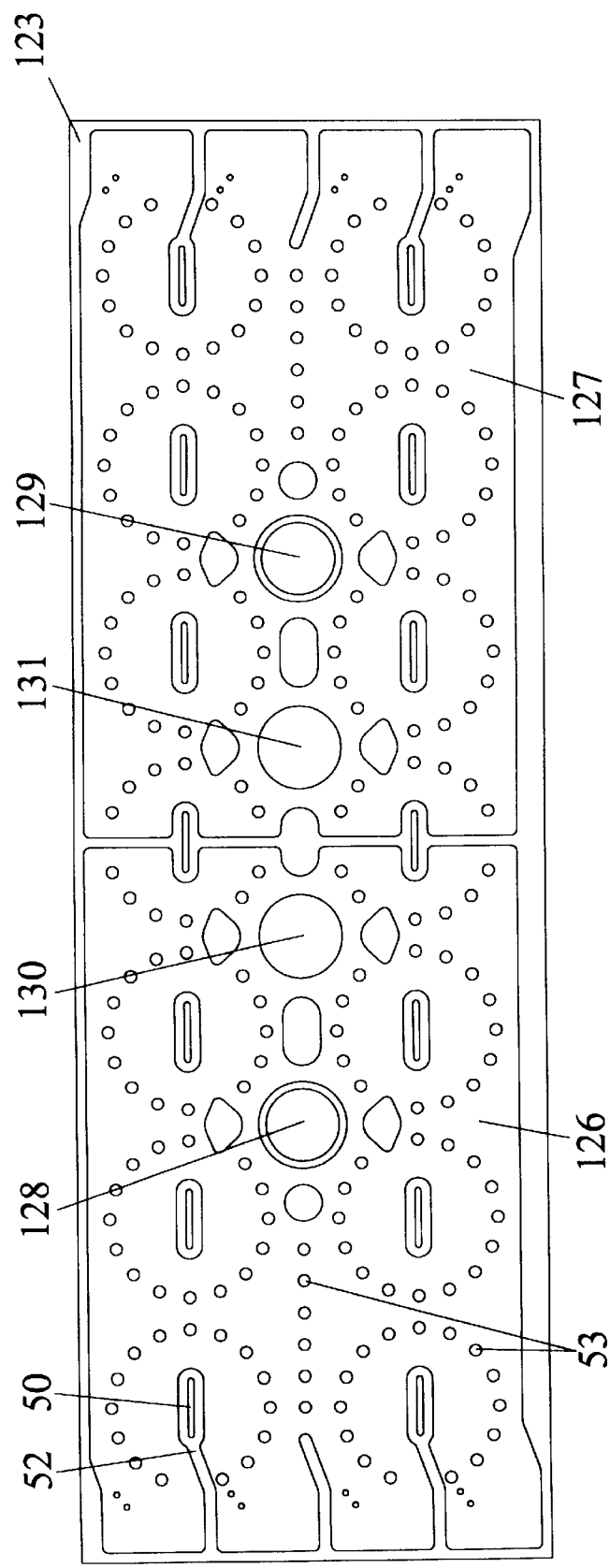
FIG. 5d is a bottom view of the third layer of the layered manifold assembly of FIG. 5a, which defines the top of the oxidant supply and exhaust chambers.

FIG. 5d shows a bottom view of third layer 123 which defines the top of oxidant supply and exhaust chambers, 126 and 127 respectively.

The following example has been included to illustrate an embodiment of the invention but should not be construed as limiting in any way.

EXAMPLE

Layered manifold assemblies were designed and constructed for a 75 kW fuel cell array in general accordance with the embodiment depicted in FIG. 1. The array comprises four fuel cell stacks, each comprising 110 cells in series, and uses the layered manifold assemblies as end plates. Sequential flow switching of the oxidant and coolant in each fuel cell stack was also to be employed. The array comprising the layered manifold assembly Was designed to be operated using hydrogen, air, and purified water as the fuel, oxidant, and coolant, respectively, with flow rates for each of 970, 2900, and 250 liters per minute, respectively. The resulting stoichiometries were designed to be 1.2 and 1.5 for the hydrogen and air streams, respectively, at the current densities at which the array was operated. (Stoichiometry is defined as the ratio of the amount of reactant provided to the fuel cells to the amount of reactant actually consumed by electrochemical reactions in the fuel cells.) Flow switch timing was selected such that, every thirty seconds, flow would be reversed in one of the stacks.

The layers in the layered manifold assemblies were made of a glass filled thermoplastic and were bonded together with glue. The complete assembly comprising the coolant supply, coolant exhaust, and air supply chambers (i.e. the upper assembly in FIG. 1) was about 60 mm high and 250 mm wide. The air supply chamber therein was about 13 mm×220 mm and thus the cross-sectional area for air flow was about 2800 mm$^2$ in the air chamber (equivalent to that of a 60 mm diameter pipe). Thus, the layered manifold assembly is suitable for use in a practical fuel cell array.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features that come within the spirit and scope of the invention.

What is claimed is:

1. A layered manifold assembly for an array comprising at least one internally manifolded fuel cell stack, said assembly having fluid ports and internal manifold ports for fluid connection to the internal manifolds in each fuel cell stack in said array, the layered manifold assembly comprising:

a substantially planar first layer adjacent one end of each of said at least one fuel cell stack;

a substantially planar second layer adjacent the first layer, said second and first layers defining a first chamber therebetween;

a substantially planar third layer adjacent the second layer, said third and second layers defining a second chamber therebetween;

a first fluid passage penetrating said second and third layers and fluidly connecting a first fluid port to said first chamber;

a second fluid passage penetrating said third layer and fluidly connecting a second fluid port to said second chamber;

a first manifold passage penetrating said first layer and fluidly connecting said first chamber to a first fluid internal manifold port; and a second manifold passage penetrating said first and second layers and fluidly connecting said second chamber to a second fluid internal manifold port.

2. The layered manifold assembly of claim 1 for an array comprising a plurality of internally manifolded fuel cell stacks, the layered manifold assembly comprising a plurality of first manifold passages, second manifold passages, first fluid internal manifold ports, and second fluid internal manifold ports.

3. The layered manifold assembly of claim 2 further comprising:

a substantially planar fourth layer adjacent said third layer, said third and fourth layers defining a third chamber therebetween, and said first and second fluid passages further penetrating said fourth layer;

a third fluid passage penetrating said fourth layer and fluidly connecting a third fluid port to said third chamber; and third manifold passages penetrating said third, second, and first layers and fluidly connecting said third chamber to third fluid internal manifold ports.

4. The layered manifold assembly of claim 3 further comprising:

a plurality of substantially planar layers each of which is adjacent to a previous layer, each pair of adjacent layers defining an additional chamber therebetween, and each previous fluid passage further penetrating said plurality of layers;

a plurality of fluid passages penetrating said plurality of layers and fluidly connecting an additional fluid port to each of the additional chambers; and a plurality of manifold passages penetrating each previous layer and fluidly connecting each additional chamber to an internal manifold port.

5. The layered manifold assembly of claim 1 wherein the cross sectional area for fluid flow in at least one of said first or second chambers is greater than that of a pipe having a diameter equal to the thickness of said layered manifold assembly.

6. The layered manifold assembly of claim 1 wherein said second fluid passage further penetrates said second layer.

7. The layered manifold assembly of claim 1 wherein said first and second fluid ports are located near the center of the plane of the assembly.

8. The layered manifold assembly of claim 2 further comprising:

an additional chamber defined between at least one pair of adjacent layers;

an additional fluid passage penetrating at least the third plate and fluidly connecting an additional fluid port to said additional chamber; and additional manifold passages penetrating at least said first layer and fluidly connecting said additional chamber to additional fluid internal manifold ports.

9. The layered manifold assembly of claim 8 wherein the two fluid ports connected to the two chambers in said at least one pair of adjacent layers are the supply port and the exhaust port for a fuel cell stack fluid.

10. The layered manifold assembly of claim 1 further comprising valves for controlling fluid flow in each of the manifold passages that are fluidly connected to one of said chambers.

11. The layered manifold assembly of claim 10 wherein said manifold passages are for fluidly connecting said chamber to more than one fuel cell stack and fluid flow in each of said passages can be controlled independently by operation of said valves.

12. The layered manifold assembly of claim 10 wherein said manifold passages comprise a pair of passages for fluidly connecting said chamber to a pair of internal manifolds in a single fuel cell stack, and said valves are operatively connected to alternate fluid flow in each of said pair of passages.

13. The layered manifold assembly of claim 3 wherein the first, second, and third fluid ports are each one of the oxidant supply, the coolant supply, and the coolant exhaust ports.

14. The layered manifold assembly of claim 9 wherein the two fluid ports connected to the two chambers in said at least one pair of adjacent layers are the fuel supply port and the fuel exhaust port.

15. The layered manifold assembly of claim 12 wherein said first and second chambers are coolant chambers and said assembly further comprises:

valves for controlling coolant flow in each of a pair of manifold passages that are fluidly connected to the first chamber; and valves for controlling coolant flow in each of a pair of manifold passages that are fluidly connected to the second chamber.

16. The layered manifold assembly of claim 12 wherein said first and second chambers are oxidant chambers and said assembly further comprises:

valves for controlling oxidant flow in each of a pair of manifold passages that are fluidly connected to the first chamber; and valves for controlling oxidant flow in each of a pair of manifold passages that are fluidly connected to the second chamber.

17. A manifolded fuel cell array of at least one internally manifolded fuel cell stack comprising the layered manifold assembly of claim 1.

18. A manifolded fuel cell array of at least one internally manifolded fuel cell stack comprising the layered manifold assembly of claim 10.

19. The manifolded fuel cell array of claim 17 wherein said at least one internally manifolded fuel cell stack comprises solid polymer fuel cells.

20. The manifolded fuel cell array of claim 17 wherein said at least one internally manifolded fuel cell stack comprises fuel cells with substantially linear fluid flow fields extending across each fuel cell.

21. A method of periodically reversing the flow of a fluid in a manifolded fuel cell array of internally manifolded fuel cell stacks, the method comprising:

(a) incorporating a supply manifold assembly in the array, the supply manifold assembly comprising:

a pair of adjacent substantially planar layers defining a supply chamber therebetween;

a supply passage in the supply manifold assembly for fluidly connecting a fluid supply to said supply chamber;

supply manifold passages for fluidly connecting said supply chamber via internal manifold ports alternately to each of a pair of manifolds in each stack in said array; and valves for controlling fluid flow in each of said supply manifold passages;

(b) incorporating an exhaust manifold assembly in the array, the exhaust manifold assembly comprising:

a pair of adjacent substantially planar layers defining an exhaust chamber therebetween;

an exhaust passage in the exhaust manifold assembly for fluidly connecting a fluid exhaust to said exhaust chamber;

exhaust manifold passages for fluidly connecting said exhaust chamber via internal manifold ports alternately to each of said pair of manifolds in each stack in said array; and valves for controlling fluid flow in each of said exhaust manifold passages; wherein each of said pair of internal manifolds is fluidly connected to opposite ends of flow fields for said fluid in each fuel cell; and said valves are operated so that one of said pair of internal manifolds in each fuel cell stack is fluidly connected to said supply chamber but not to said exhaust chamber; and (c) at periodic intervals, adjusting the settings of said valves whereby flow of said fluid through said flow fields is periodically reversed.

22. The method of periodically reversing the flow of a fluid in a manifolded fuel cell array of claim 21 wherein the flow through each of said pair of internal manifolds in each fuel cell stack in the array is reversed at different times.

23. A layered manifold assembly for an array comprising at least one internally manifolded fuel cell stack, said assembly having fluid ports and internal manifold ports for fluid connection to the internal manifolds in each fuel cell stack in said array, the layered manifold assembly comprising:

a first layer adjacent one end of each of said at least one fuel cell stack;

a second layer adjacent the first layer, said second and first layers defining a first chamber therebetween;

a third layer adjacent the second layer, said third and second layers defining a second chamber therebetween;

a first fluid passage penetrating said second and third layers and fluidly connecting a first fluid port to said first chamber;

a second fluid passage penetrating said third layer and fluidly connecting a second fluid port to said second chamber;

a first manifold passage penetrating said first layer and fluidly connecting said first chamber to a first fluid internal manifold port; and a second manifold passage penetrating said first and second layers and fluidly connecting said second chamber to a second fluid internal manifold port.

\* \* \* \* \*

UNITED STATES PATENT AND TRADEMARK OFFICE
CERTIFICATE OF CORRECTION

PATENT NO.   : 6,159,629
DATED        : December 12, 2000
INVENTOR(S)  : Peter R. Gibb, David Kau-Kee Yip It is certified that error appears in the above-identified patent and that said Letters Patent is hereby corrected as shown below:

<u>Title page, Item [54], and Column 1, line 1,</u>
Title, the word "EFFECIENT" should read -- EFFICIENT --.

<u>Column 7,</u>
Line 49, the words "Fig. c." should read -- Fig. 1. --.

Signed and Sealed this

Nineteenth Day of March, 2002

Attest:

*Attesting Officer*

JAMES E. ROGAN
*Director of the United States Patent and Trademark Office*